(12) United States Patent
Shirai et al.

(10) Patent No.: US 6,710,859 B2
(45) Date of Patent: Mar. 23, 2004

(54) DISTANCE MEASUREMENT APPARATUS

(75) Inventors: Noriaki Shirai, Kariya (JP); Takeshi Matsui, Toyohashi (JP); Katsuhiro Morikawa, Nagoya (JP); Katsuji Kosaka, Anjo (JP); Yuji Kimura, Nagoya (JP)

(73) Assignee: Denso Corporation, Kariya (JP)

( * ) Notice: Subject to any disclaimer, the term of this patent is extended or adjusted under 35 U.S.C. 154(b) by 184 days.

(21) Appl. No.: 09/977,231

(22) Filed: Oct. 16, 2001

(65) Prior Publication Data

US 2002/0071126 A1 Jun. 13, 2002

(30) Foreign Application Priority Data

Dec. 12, 2000 (JP) .......................................... 2000-377205

(51) Int. Cl.⁷ ................................................. G01C 3/08
(52) U.S. Cl. ...................... 356/5.01; 356/4.01; 180/169
(58) Field of Search ................................ 356/614, 615, 356/621, 622, 623, 3.01, 3.05, 3.09, 3.11, 4.01, 4.06, 4.07, 5.01, 5.02, 11, 29; 180/167, 169; 250/559.29, 559.31, 559.4

(56) References Cited

U.S. PATENT DOCUMENTS

| | | | | |
|---|---|---|---|---|
| 5,336,899 A | * | 8/1994 | Nettleton et al. | 250/559.29 |
| 5,699,149 A | * | 12/1997 | Kuroda et al. | 356/4.01 |
| 5,724,141 A | * | 3/1998 | Nishino | 356/623 |
| 5,831,717 A | * | 11/1998 | Ikebuchi | 356/4.01 |
| 6,057,910 A | * | 5/2000 | Dunne | 356/5.05 |
| 6,381,261 B1 | * | 4/2002 | Nagazumi | 375/138 |
| 6,452,665 B1 | * | 9/2002 | Kikuchi | 356/4.01 |

FOREIGN PATENT DOCUMENTS

| | | |
|---|---|---|
| JP | A-7-134178 | 5/1995 |
| JP | A-9-197045 | 7/1997 |
| JP | A-11-94945 | 4/1999 |
| JP | A-11-148974 | 6/1999 |

* cited by examiner

Primary Examiner—Russell Adams
Assistant Examiner—Andrew Sever
(74) Attorney, Agent, or Firm—Posz & Bethards, PLC

(57) ABSTRACT

A scanning device periodically changes the direction of the transmission of an electromagnetic wave from an electromagnetic wave generating device. A first driving device operates for repetitively driving the electromagnetic wave generating device a plurality of times per one period of the change of the direction by the scanning device, and thereby for repetitively transmitting a distance measurement electromagnetic wave. A second driving device operates for, before the first driving device drives the electromagnetic wave generating device, driving the electromagnetic wave generating device and thereby transmitting a judgment electromagnetic wave having an energy smaller than that of the distance measurement electromagnetic wave. An obstacle judging device permits the first driving device to drive the electromagnetic wave generating device next in cases where a detected obstacle is absent, and inhibits the first driving device from driving the electromagnetic wave generating device next in cases where a detected obstacle is present.

10 Claims, 6 Drawing Sheets

DISTANCE MEASUREMENT APPARATUS

BACKGROUND OF THE INVENTION

1. Field of the Invention

This invention relates to a distance measurement apparatus for transmitting an electromagnetic wave beam such as a laser beam, receiving an echo, calculating the time interval between the moment of the transmission of the beam and the moment of the reception of the echo, and measuring, from the calculated time interval, the distance to an object reflecting the beam and causing the echo.

2. Description of the Related Art

There is a conventional distance measurement apparatus mounted on a vehicle. The conventional apparatus intermittently emits a laser beam into a predetermined angular range outside the body of the vehicle. The predetermined angular range is scanned by the laser beam. Thus, the predetermined angular range is also referred to as the scanned range. When an object in the scanned range reflects the laser beam, a portion of the laser beam returns to the apparatus as an echo. The apparatus measures the time difference between the timing of the emission of the laser beam and the timing of the reception of the echo. The apparatus calculates the distance to the object on the basis of the measured time difference. The apparatus recognizes the direction of the emission of the laser beam which is returned as the echo. The apparatus detects the direction of the object relative to the vehicle in accordance with the recognized direction of the emission of the laser beam.

As the power of the emitted laser beam rises, the measurable distance to an object increases. A laser beam having an excessively high power adversely affects human eyes when being incident thereto. As a laser diode is driven at a higher power to generate a stronger laser beam, the life of the laser diode shortens.

Japanese patent application publication number 7-134178 discloses an on-vehicle distance measuring device using a laser beam which is designed to control the power of the laser beam to perform a proper measurement and avoid a bad effect on human bodies. In the distance measuring device of Japanese application 7-134178, the power of the laser beam is reduced as the distance to a target to be measured decreases. Also, the power of the laser beam is reduced as the relative speed between the target and the vehicle or the speed of the vehicle decreases. Therefore, the measurable distance to a target is short when the relative speed between the target and the vehicle or the speed of the vehicle is low.

Japanese patent application publication number 9-197045 discloses an on-vehicle radar device using a laser beam which is designed to control the power of the laser beam to avoid a bad effect on human bodies. Operation of the radar device in Japanese application 9-197045 is alternately changed between a preliminary scanning mode and a main scanning mode. During the preliminary scanning mode of operation, a predetermined angular range outside the body of the vehicle is scanned by the laser beam having a low power. A memory is loaded with preliminary data representative of laser beam transmission directions and distances to detected targets which are available in the preliminary scanning mode of operation. During the main scanning mode of operation which follows the preliminary scanning mode of operation, first portions of the predetermined angular range are scanned by the laser beam having a high power while second portions thereof are inhibited from being scanned. Specifically, the preliminary data in the memory are referred to, and suspension is given of the transmission of the laser beam in the directions in which targets in short distances have been detected during the preliminary scanning mode of operation. On the other hand, the laser beam having a high power is transmitted in the directions from which detected targets have been absent during the preliminary mode of operation.

In the radar device in Japanese application 9-197045, there is a timing difference between the preliminary scanning mode of operation and the main scanning mode of operation. During the preliminary scanning mode of operation, the predetermined angular range is fully scanned, and the preliminary data are stored into the memory. The timing difference, the fully scanning, and the storing of the preliminary data cause a slow response characteristic of the radar device.

Japanese patent application publication number 11-94945 discloses an on-vehicle laser radar device which scans a predetermined angular range outside the body of the vehicle by a train of pulses of a laser beam. In the radar device of Japanese application 11-94945, the number of pulses of the laser beam per unit time is changed depending on the speed of the vehicle or the distance to a measured object. Specifically, the number of pulses of the laser beam per unit time is set to a reduced value when the speed of the vehicle is equal to or lower than a prescribed value. The number of pulses of the laser beam per unit time is set to a reduced value when the distance to a measured object is equal to or shorter than a prescribed value.

Japanese patent application publication number 11-148974 discloses a distance measurement apparatus which transmits a train of pulses of a laser beam as forward pulses. When the forward pulses encounter an object and are reflected thereby, echo pulses occur correspondingly. The distance measurement apparatus of Japanese application 11-148974 includes a processor for detecting whether or not the amplitude of every received echo pulse is greater than a prescribed threshold value. The forward-pulse amplitude is increased as time goes by. During the increase in the forward-pulse amplitude, the processor detects a first received echo pulse whose amplitude exceeds the prescribed threshold value. The distance to an object is calculated on the basis of the detected first received echo pulse and the corresponding forward pulse. Immediately after the above-indicated first received echo pulse is detected, the forward-pulse transmission is suspended.

SUMMARY OF THE INVENTION

It is an object of this invention to provide a distance measurement apparatus having a good response characteristic.

A first aspect of this invention provides a distance measurement apparatus comprising electromagnetic wave generating means for generating and transmitting an electromagnetic wave; scanning means for periodically changing a direction in which the electromagnetic wave is transmitted from the electromagnetic wave generating means; receiving means for receiving an echo wave caused by reflection of the electromagnetic wave at an obstacle; first driving means for repetitively driving the electromagnetic wave generating means a plurality of times per one period of the change of the direction by the scanning means, and thereby for causing the electromagnetic wave generating means to repetitively generate and transmit a distance measurement electromagnetic wave; first calculating means for measuring a time interval between a moment of every generation and transmission of the distance measurement electromagnetic wave by the electromagnetic wave generating means in response to drive by the first driving means to a moment of reception of a corresponding echo wave by the receiving means, and for calculating a distance to an obstacle on the basis of the measured time interval; second driving means for, before the first driving means drives the electromagnetic wave generating means, driving the electromagnetic wave generating means and thereby causing the electromagnetic wave generating means to generate and transmit a judgment electromagnetic wave having an energy smaller than that of the distance measurement electromagnetic wave; and obstacle judging means for judging whether an obstacle is present or absent on the basis of conditions of reception of an echo wave corresponding to the judgement electromagnetic wave by the receiving means, for permitting the first driving means to drive the electromagnetic wave generating means next in cases where it is judged that an obstacle is absent, and for inhibiting the first driving means from driving the electromagnetic wave generating means next in cases where it is judged that an obstacle is present.

A second aspect of this invention provides a distance measurement apparatus comprising electromagnetic wave generating means for generating and transmitting an electromagnetic wave; scanning means for periodically changing a direction in which the electromagnetic wave is transmitted from the electromagnetic wave generating means; receiving means for receiving an echo wave caused by reflection of the electromagnetic wave at an obstacle; first driving means for repetitively driving the electromagnetic wave generating means a plurality of times per one period of the change of the direction by the scanning means, and thereby for causing the electromagnetic wave generating means to repetitively generate and transmit a distance measurement electromagnetic wave; first calculating means for measuring a time interval between a moment of every generation and transmission of the distance measurement electromagnetic wave by the electromagnetic wave generating means in response to drive by the first driving means to a moment of reception of a corresponding echo wave by the receiving means, and for calculating a distance to an obstacle on the basis of the measured time interval; second driving means for, before the driving means drives the electromagnetic wave generating means, driving the electromagnetic wave generating means and thereby causing the electromagnetic wave generating means to generate and transmit a judgment electromagnetic wave having an energy smaller than that of the distance measurement electromagnetic wave; and obstacle judging means for judging whether an obstacle is present or absent on the basis of conditions of reception of an echo wave corresponding to the judgement electromagnetic wave by the receiving means, for causing the first driving means to drive the electromagnetic wave generating means next to generate and transmit a first distance measurement electromagnetic wave in cases where it is judged that an obstacle is absent, and for causing the first driving means to drive the electromagnetic wave generating means next to generate and transmit a second distance measurement electromagnetic wave in cases where it is judged that an obstacle is present, wherein the second distance measurement electromagnetic wave is lower in energy than the first distance measurement electromagnetic wave.

A third aspect of this invention is based on the second aspect thereof, and provides a distance measurement apparatus wherein the second distance measurement electromagnetic wave is lower in amplitude than the first distance measurement electromagnetic wave.

A fourth aspect of this invention is based on the second aspect thereof, and provides a distance measurement apparatus wherein a duration of generation of the second distance measurement electromagnetic wave is shorter than that of the first distance measurement electromagnetic wave.

A fifth aspect of this invention is based on the second aspect thereof, and provides a distance measurement apparatus wherein each of the first distance measurement electromagnetic wave and the second distance measurement electromagnetic wave contains at least one pulse, and a pulse in the second distance measurement electromagnetic wave is smaller in width than that in the first distance measurement electromagnetic wave.

A sixth aspect of this invention is based on the second aspect thereof, and provides a distance measurement apparatus wherein each of the first distance measurement electromagnetic wave and the second distance measurement electromagnetic wave contains at least one pulse, and the second distance measurement electromagnetic wave is smaller in pulse number than the first distance measurement electromagnetic wave.

A seventh aspect of this invention is based on the second aspect thereof, and provides a distance measurement apparatus wherein the first distance measurement electromagnetic wave results from modulation in accordance with a pseudo noise code having a first bit length, and the second distance measurement electromagnetic wave results from modulation in accordance with a pseudo noise code having a second bit length smaller than the first bit length.

An eighth aspect of this invention is based on the second aspect thereof, and provides a distance measurement apparatus wherein the obstacle judging means comprises second calculating means for measuring a time interval between a moment of every generation and transmission of the judgement electromagnetic wave by the electromagnetic wave generating means in response to drive by the second driving means to a moment of reception of a corresponding echo wave by the receiving means, and for calculating a distance to an obstacle on the basis of the measured time interval, and judging means for judging whether an obstacle is present in or absent from a prescribed distance range on the basis of the distance calculated by the second calculating means.

A ninth aspect of this invention provides a distance measurement apparatus comprising first means for emitting a first laser beam in a first direction, the first laser beam having a first power; second means for receiving an echo corresponding to the first laser beam; third means for determining whether or not the second means receives an echo corresponding to the first laser beam; fourth means for emitting a second laser beam in the first direction in cases where the third means have determined that the second means receives an echo corresponding to the first laser beam, the second laser beam having a second power; fifth means for emitting a third laser beam in the first direction in cases where the third means have determined that the second means does not receive an echo corresponding to the first laser beam, the third laser beam having a third power, the third power being higher than the first power, the third power being higher than the second power; sixth means for emitting a fourth laser beam in a second direction after the fourth means emits the second laser beam or the fifth means emits the third laser beam, the second direction being different from the first direction, the fourth laser beam having the first power; seventh means for receiving an echo corresponding to the fourth laser beam; eighth means for determining whether or not the seventh means receives an echo corresponding to the fourth laser beam; ninth means for emitting a fifth laser beam in the second direction in cases where the eighth means have determined that the seventh means receives an echo corresponding to the fourth laser beam, the fifth laser beam having the second power; and tenth means for emitting a sixth laser beam in the second direction in cases where the eighth means have determined that the seventh means does not receive an echo corresponding to the fourth laser beam, the sixth laser beam having the third power.

A tenth aspect of this invention provides a distance measurement apparatus comprising first means for emitting a first laser beam in a first direction, the first laser beam having a first power; second means for receiving an echo corresponding to the first laser beam; third means for determining whether or not the second means receives an echo corresponding to the first laser beam; fourth means for emitting a second laser beam in the first direction in cases where the third means have determined that the second means does not receive an echo corresponding to the first laser beam, the second laser beam having a second power higher than the first power; fifth means for inhibiting the fourth means from emitting the second laser beam in cases where the third means have determined that the second means receives an echo corresponding to the first laser beam; sixth means for emitting a third laser beam in a second direction after the fourth means emits the second laser beam or the fifth means inhibits the fourth means from emitting the second laser beam, the second direction being different from the first direction, the third laser beam having the first power; seventh means for receiving an echo corresponding to the third laser beam; eighth means for determining whether or not the seventh means receives an echo corresponding to the third laser beam; ninth means for emitting a fourth laser beam in the second direction in cases where the eighth means have determined that the seventh means does not receive an echo corresponding to the third laser beam, the fourth laser beam having the second power; and tenth means for inhibiting the ninth means from emitting the fourth laser beam in cases where the eighth means have determined that the seventh means receives an echo corresponding to the third laser beam.

DETAILED DESCRIPTION OF THE INVENTION

First Embodiment

Figure 1:
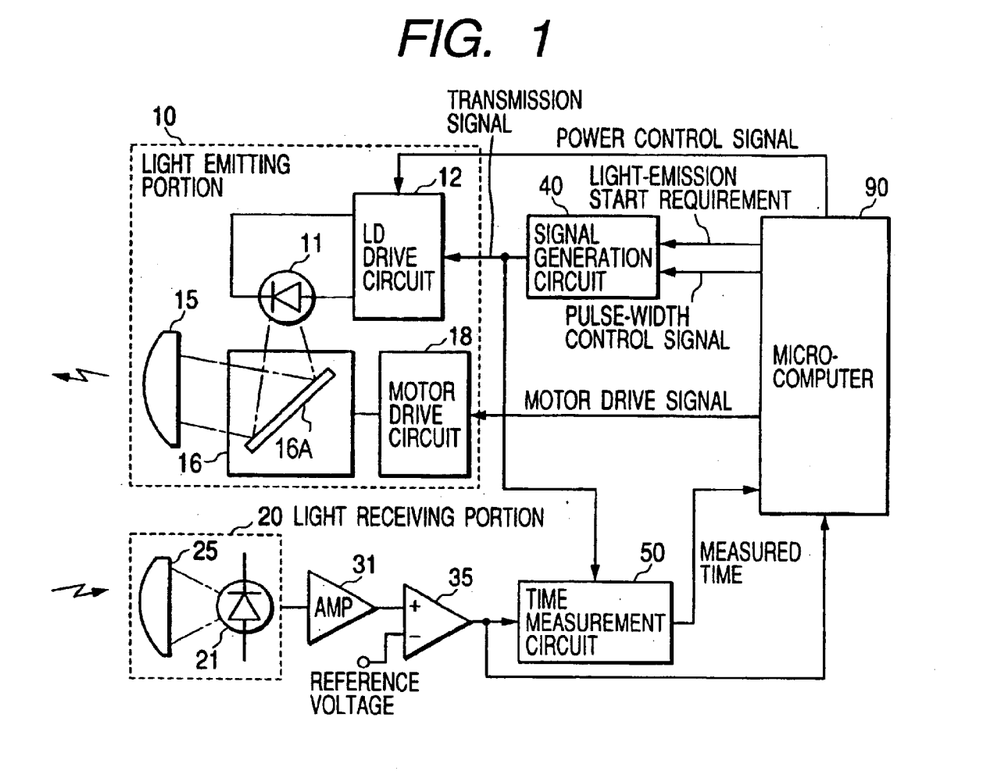
FIG. 1 is a diagram of a distance measurement apparatus according to a first embodiment of this invention.

FIG. 1 shows a distance measurement apparatus according to a first embodiment of this invention. The apparatus of FIG. 1 is mounted on a vehicle (a subject vehicle). The apparatus of FIG. 1 measures the distance to an object from the subject vehicle. The object is, for example, an obstacle to the subject vehicle or a vehicle traveling ahead of the subject vehicle.

The apparatus of FIG. 1 includes a light emitting portion 10, a light receiving portion 20, an amplifier 31, a comparator 35, a signal generation circuit 40, a time measurement circuit 50, and a microcomputer 90. The microcomputer 90 has a combination of an input/output port, a CPU, a RAM, and a ROM. The microcomputer 90 operates in accordance with a program stored in the ROM.

The light emitting portion 10 contains a light emitting element (for example, a laser diode) 11, a laser-diode drive circuit 12, a lens 15, a scanner 16, and a motor drive circuit 18. The scanner 16 has a mirror 16A and a motor (not shown). The mirror 16A is mechanically connected with the output shaft of the motor. The mirror 16A can be rotated by the motor. The motor is electrically connected to the motor drive circuit 18. The motor drive circuit 18 is connected to the microcomputer 90. The laser diode 11 is connected to the laser-diode drive circuit 12. The laser-diode drive circuit 12 is connected to the signal generation circuit 40 and the microcomputer 90.

The laser-diode drive circuit 12 receives a transmission signal from the signal generation circuit 40. The transmission signal has a train of pulses. The laser-diode drive circuit 12 receives a power control signal from the microcomputer 90. The laser-diode drive circuit 12 activates and deactivates the laser diode 11 in response to the transmission signal so that the laser diode 11 emits pulse laser light. Every pulse of the laser light corresponds to a pulse in the transmission signal. The laser-diode drive circuit 12 adjusts the power of the pulse laser light in response to the power control signal. The pulse laser light travels from the laser diode 11 to the mirror 16A before being reflected thereby. The reflection-resultant pulse laser light propagates through the lens 15, being narrowed and outputted from the light emitting portion 10 as a forward pulse laser beam.

The motor drive circuit 18 receives a motor drive signal from the microcomputer 90. The motor drive circuit 18 activates the motor in response to the motor drive signal so that the motor periodically and cyclically rotates the mirror 16A along clockwise and counterclockwise directions in a predetermined limited angular range. The periodical and cyclical rotation of the mirror 16A causes periodical and cyclical deflection of the forward pulse laser beam, thereby enabling a given angular region in front of the subject vehicle to be periodically scanned by the forward pulse laser beam. The given angular region corresponds to a given sectorial detection area (a given sectorial scanned area) monitored by the apparatus of FIG. 1. The given angular region or the given sectorial detection area extends horizontally with respect to the subject vehicle.

The light receiving portion 20 contains a light receiving element 21 and a lens 25. The light receiving element 21 includes, for example, a photodiode or a photodetector. The light receiving element 21 is connected to the amplifier 31. The amplifier 31 is connected to the comparator 35. The comparator 35 is connected to the time measurement circuit 50 and the microcomputer 90. The time measurement circuit 50 is connected to the signal generation circuit 40 and the microcomputer 90.

In the case where an object exists in the detection area (the given angular region), the forward pulse laser beam encounters the object before being at least partially reflected thereby. A portion of the reflected pulse laser beam returns to the apparatus of FIG. 1 as an echo pulse laser beam. Specifically, the echo pulse laser beam travels through the lens 25 before being incident to the light receiving element 21. The light receiving element 21 converts the echo pulse laser beam into a corresponding electric signal (referred to as an echo signal). The light receiving element 21 outputs the electric signal to the amplifier 31. The device 31 amplifies the output signal of the light receiving element 21. The amplifier 31 outputs the amplification-resultant signal to the comparator 35. The device 35 compares the output signal of the amplifier 31 with a predetermined reference voltage (a predetermined threshold voltage) Vth for object detection, thereby converting the output signal of the amplifier 31 into a binary decision signal or a pulse decision signal. The binary decision signal is in its high-level state when the voltage of the output signal of the amplifier 31 exceeds the predetermined reference voltage Vth. Otherwise, the binary decision signal is in its low-level state. The binary decision signal in its high-level state represents the reception of an echo from an object. The comparator 31 outputs the binary decision signal (the pulse decision signal) to the time measurement circuit 50 and the microcomputer 90.

During the distance measurement, the microcomputer 90 generates the motor drive signal. The microcomputer 90 outputs the motor drive signal to the motor drive circuit 18. As previously mentioned, the motor drive circuit 18 activates the motor in response to the motor drive signal so that the motor periodically and cyclically rotates the mirror 16A along clockwise and counterclockwise directions in the predetermined limited angular range. The periodical and cyclical rotation of the mirror 16A causes the detection area to be periodically scanned by the forward pulse laser beam. Preferably, the period of the scanning is fixed to a prescribed value.

The microcomputer 90 is connected with the signal generation circuit 40. The microcomputer 90 generates a light-emission start requirement signal and a pulse-width control signal. The microcomputer 90 outputs the light-emission start requirement signal and the pulse-width control signal to the signal generation circuit 40 in synchronism with outputting the motor drive signal. Specifically, the microcomputer 90 repetitively executes outputting the light-emission start requirement signal and the pulse-width control signal plural times per period of the scanning of the detection area. The signal generation circuit 40 produces the transmission signal in response to the light-emission start requirement signal and the pulse-width control signal. The transmission signal has a train of pulses. The time point of the leading edge of every pulse in the transmission signal is determined by the light-emission start requirement signal. The width of every pulse in the transmission signal is determined by the pulse-width control signal. As previously mentioned, the laser-diode drive circuit 12 activates and deactivates the laser diode 11 in response to the transmission signal so that the laser diode 11 emits the pulse laser light. Every pulse of the laser light corresponds to a pulse in the transmission signal. Therefore, the time point of the leading edge of every pulse in the laser light is determined by the light-emission start requirement signal. The width of every pulse in the laser light is determined by the pulse-width control signal.

The microcomputer 90 generates the power control signal. The microcomputer 90 outputs the power control signal to the laser-diode drive circuit 12. As previously mentioned, the laser-diode drive circuit 12 adjusts the power of the pulse laser light in response to the power control signal.

Figure 2:
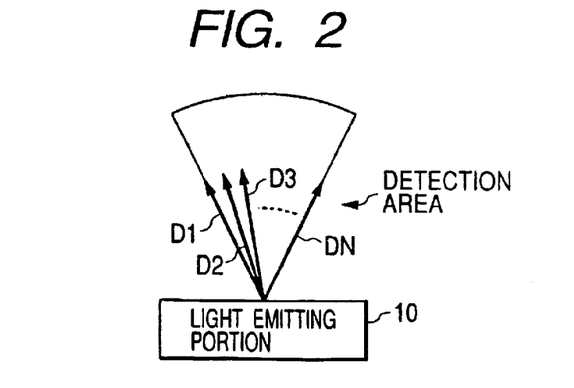
FIG. 2 is a diagram of directions in which a forward laser beam is outputted from a light emitting portion in FIG. 1.

During every scanning period, a plurality of pulses of the forward laser beam are sequentially transmitted from the light emitting portion 10 in different directions (different angular directions) D1, D2, D3, . . . , and DN which form the detection area as shown in FIG. 2. Here, "N" denotes a predetermined natural number. Specifically, during every scanning period, a train of pulses of the forward laser beam is transmitted from the light emitting portion 10 in a direction which is sequentially changed among the directions D1–DN. In the case where an object exists at a position in the detection area which corresponds to one of the directions (the angular directions) D1–DN, a pulse of the forward laser beam encounters the object before being at least partially reflected thereby. A portion of the reflected laser beam pulse returns to the apparatus of FIG. 1 as an echo laser beam pulse. Specifically, the echo laser beam pulse is incident to the light receiving element 21, being converted into a corresponding electric signal (an echo signal). The echo signal travels from the light receiving element 21 to the comparator 35 via the amplifier 31. In response to the echo signal, the comparator 35 outputs a high-level decision signal representing the reception of the echo laser beam pulse by the light receiving element 21. In the absence of an echo laser beam pulse received by the light receiving element 21, the comparator 35 outputs a low-level decision signal. Every pulse in the decision signal outputted from the comparator 35 corresponds to one of pulses in the transmission signal produced by the signal generation circuit 40.

The time measurement circuit 50 receives the binary decision signal from the comparator 35. The time measurement circuit 50 receives the transmission signal from the signal generation circuit 40. The time measurement circuit 50 measures the time interval between a pulse in the binary decision signal and a corresponding pulse in the transmission signal. The time measurement circuit 50 generates a signal representing the measured time interval. The time measurement circuit 50 outputs the time-interval-representing signal to the microcomputer 90.

The microcomputer 90 calculates the distance to an object from the subject vehicle on the basis of the velocity of light and the measured time interval represented by the output signal of the time measurement circuit 50. In the case where the calculated distance to an object is shorter than a reference value, the microcomputer 90 outputs a signal of warning an occupant of the subject vehicle about a collision. Preferably, in this case, the microcomputer 90 activates a braking system of the subject vehicle to reduce the speed thereof.

Figure 3:
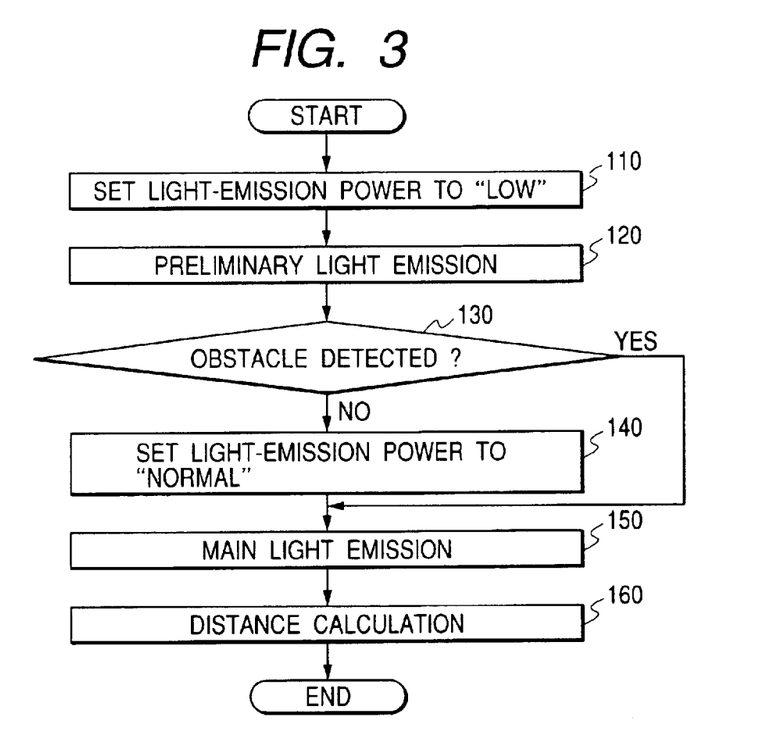
FIG. 3 is a flowchart of a segment of a program for a microcomputer in FIG. 1.

As previously mentioned, the microcomputer 90 operates in accordance with a program stored in the internal ROM. FIG. 3 is a flowchart of a segment of the program. The program segment in FIG. 3 is executed for each of the directions (the angular directions) D1–DN of the transmission of the forward pulse laser beam which form the detection area. Thus, during every cycle or period of the motor drive signal outputted from the microcomputer 90 to the motor drive circuit 18, that is, during every period of the scanning of the detection area by the forward pulse laser beam, the program segment in FIG. 3 is repetitively executed a plurality of times.

As shown in FIG. 3, a first step 110 of the program segment sets the power control signal into a state corresponding to lower than a normal power.

A step 120 following the step 110 outputs the light-emission start requirement signal and the pulse-width control signal to the signal generation circuit 40. Therefore, the pulse generation circuit 40 outputs a pulse of the transmission signal to the laser-diode drive circuit 12. The time point of the leading edge of the pulse is determined by the light-emission start requirement signal, while the width of the pulse is determined by the pulse-width control signal.

The laser-diode drive circuit 12 activates the laser diode 11 in response to the pulse of the transmission signal so that the laser diode 11 emits a corresponding pulse of the laser light. The time point of the leading edge of the pulse of the laser light is determined by the light-emission start requirement signal, while the width of the pulse of the laser light is determined by the pulse-width control signal. Since the power control signal is in the state corresponding to lower than the normal power, the power of the pulse of the laser light is lower than the normal power. The pulse of the laser light is made into a pulse of the forward laser beam. Since the power of the pulse of the forward laser beam is relatively low, the measurable distance to an object is shorter than normal one. Accordingly, only in the presence of an object spaced from the subject vehicle by shorter than the normal measurable distance, the comparator 35 outputs a high-level decision signal representing the reception of an echo.

A step 130 subsequent to the step 120 determines whether or not the comparator 35 outputs a high-level decision signal during a time interval corresponding to the low-power measurable distance. In the case where the comparator 35 outputs a high-level decision signal, that is, in the case where an object (an obstacle) is detected, the program advances from the step 130 to a step 150. In the case where the comparator 35 does not output a high-level decision signal, that is, in the case where an object (an obstacle) is not detected, the program advances from the step 130 to a step 140.

The step 140 sets the power control signal into a state corresponding to the normal power. After the step 140, the program advances to the step 150.

The step 150 outputs the light-emission start requirement signal and the pulse-width control signal to the signal generation circuit 40. Therefore, the pulse generation circuit 40 outputs a pulse of the transmission signal to the laser-diode drive circuit 12. The time point of the leading edge of the pulse is determined by the light-emission start requirement signal, while the width of the pulse is determined by the pulse-width control signal.

The laser-diode drive circuit 12 activates the laser diode 11 in response to the pulse of the transmission signal so that the laser diode 11 emits a corresponding pulse of the laser light. The time point of the leading edge of the pulse of the laser light is determined by the light-emission start requirement signal, while the width of the pulse of the laser light is determined by the pulse-width control signal. In the case where the step 130 determines the detection of an object (an obstacle), since the power control signal remains in the state corresponding to lower than the normal power, the power of the pulse of the laser light is lower than the normal power. On the other hand, in the case where the step 130 determines that an object (an obstacle) is not detected, since the power control signal is in the state corresponding to the normal power (see the step 140), the power of the pulse of the laser light is equal to the normal power. The pulse of the laser light is made into a pulse of the forward laser beam. In the case where the power of the pulse of the forward laser beam is relatively low, the measurable distance to an object is shorter than normal one. On the other hand, in the case where the power of the pulse of the forward laser beam is equal to the normal power, the measurable distance to an object is equal to normal one. Only in the presence of an object spaced from the subject vehicle by equal to or shorter than the current measurable distance, the comparator 35 outputs a high-level decision signal representing the reception of an echo.

A step 160 following the step 150 derives the measured time interval from the output signal of the time measurement circuit 50. The step 160 calculates the distance to the detected object from the subject vehicle on the basis of the measured time interval and the velocity of light. After the step 160, the current execution cycle of the program segment ends.

The step 120 in FIG. 3 provides a preliminary emission of the laser light. The step 150 in FIG. 3 provides a main emission of the laser light which is executed after the preliminary emission thereof. A set of a preliminary emission of the laser light and a main emission thereof is executed for each of the directions (the angular directions) D1–DN of the transmission of the forward pulse laser beam which form the detection area. Thus, a set of a preliminary emission of the laser light and a main emission thereof is repetitively executed a plurality of times during every cycle or period of the motor drive signal outputted from the microcomputer 90 to the motor drive circuit 18, that is, during every period of the scanning of the detection area by the forward pulse laser beam.

Figure 4:
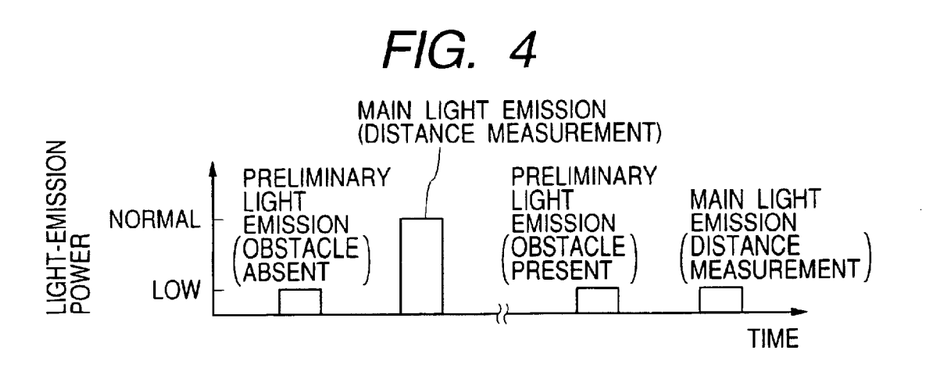
FIG. 4 is a time-domain diagram of laser light emissions implemented by the apparatus of FIG. 1.

As shown in FIG. 4, the power of the laser light generated by preliminary emissions remains equal to a prescribed low level. The power of the laser light generated by a main emission is changed between the low level and a normal level (higher than the normal level) depending on whether or not an object is detected as a result of the immediately-preceding preliminary emission. Specifically, the power of the laser light generated by a main emission is equal to the low level in the case where an object is detected as a result of the immediately-preceding preliminary emission. On the other hand, the power of the laser light generated by a main emission is equal to the normal level in the case where an object is not detected as a result of the immediately-preceding preliminary emission.

The forward pulse laser beam having a lower power less adversely affects human eyes. Since a set of a preliminary emission of the laser light and a main emission thereof is executed for each of the directions (the angular directions) D1–DN of the transmission of the forward pulse laser beam which form the detection area, the timing difference between the preliminary emission and the main emission in the set is relatively small. The small timing difference results in a good response characteristic of the apparatus of FIG. 1. In other words, the power of the forward pulse laser beam can be changed between a low level and a normal level (that is, the measurable distance can be changed between a short value and a normal value) in such a way as to provide a good response characteristic of the apparatus of FIG. 1.

The steps 110 and 120 in FIG. 3 correspond to a second driving means. The steps 130 and 140 in FIG. 3 correspond to an obstacle judging means. The step 150 in FIG. 3 corresponds to a first driving means. The step 160 in FIG. 3 and the time measurement circuit 50 in FIG. 1 correspond to a first calculating means.

It should be noted that the laser light may be replaced by other electromagnetic wave such as radio wave or millimeter wave.

Second Embodiment

A second embodiment of this invention is similar to the first embodiment thereof except for a design change mentioned hereafter. According to the second embodiment of this invention, the step 130 determines whether or not the comparator 35 outputs a high-level decision signal during a time interval corresponding to the low-power measurable distance. In the case where the comparator 35 outputs a high-level decision signal, that is, in the case where an object is detected, the program exists from the step 130 and then the current execution cycle of the program segment ends. Thus, in this case, a main emission of the laser light is inhibited. On the other hand, in the case where the comparator 35 does not output a high-level decision signal, that is, in the case where an object is not detected, the program advances from the step 130 to the step 140. The step 140 is successively followed by the steps 150 and 160. After the step 160, the current execution cycle of the program segment ends.

Preferably, the microcomputer 90 operates to notify the detection of an object at the step 130 to an occupant of the subject vehicle as a signal of warning of a collision. Preferably, in this case, the microcomputer 90 activates a braking system of the subject vehicle to reduce the speed thereof.

Third Embodiment

Figure 5:
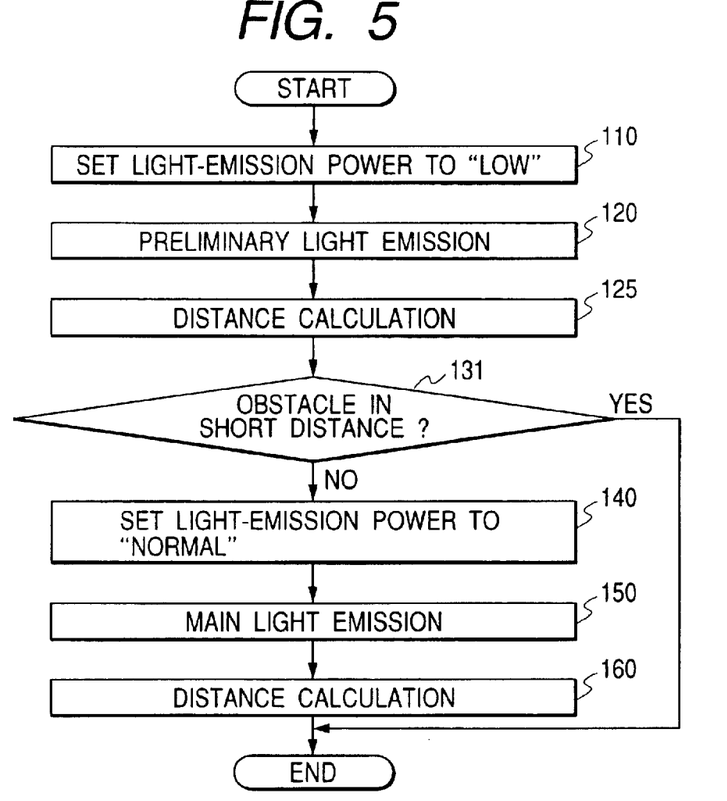
FIG. 5 is a flowchart of a segment of a program for a microcomputer in a third embodiment of this invention.

A third embodiment of this invention is similar to the first embodiment thereof except for design changes mentioned hereafter. FIG. 5 is a flowchart of a segment of a program for a microcomputer 90 (see FIG. 1) according to the third embodiment of this invention. The program segment in FIG. 5 is a modification of the program segment in FIG. 3.

As shown in FIG. 5, a first step 110 of the program segment sets the power control signal into the state corresponding to lower than the normal power.

A step 120 following the step 110 outputs the light-emission start requirement signal and the pulse-width control signal to the signal generation circuit 40 (see FIG. 1). Therefore, the pulse generation circuit 40 outputs a pulse of the transmission signal to the laser-diode drive circuit 12 (see FIG. 1). The time point of the leading edge of the pulse is determined by the light-emission start requirement signal, while the width of the pulse is determined by the pulse-width control signal.

The laser-diode drive circuit 12 activates the laser diode 11 (see FIG. 1) in response to the pulse of the transmission signal so that the laser diode 11 emits a corresponding pulse of the laser light. The time point of the leading edge of the pulse of the laser light is determined by the light-emission start requirement signal, while the width of the pulse of the laser light is determined by the pulse-width control signal. Since the power control signal is in the state corresponding to lower than the normal power, the power of the pulse of the laser light is lower than the normal power. The pulse of the laser light is made into a pulse of the forward laser beam. Since the power of the pulse of the forward laser beam is relatively low, the measurable distance to an object is shorter than normal one. Accordingly, only in the presence of an object spaced from the subject vehicle by shorter than the normal measurable distance, the comparator 35 (see FIG. 1) outputs a high-level decision signal representing the reception of an echo.

A step 125 subsequent to the step 120 derives the measured time interval from the output signal of the time measurement circuit 50 (see FIG. 1). The step 125 calculates the distance to the detected object from the subject vehicle on the basis of the measured time interval and the velocity of light. In the absence of a received echo, the step 125 detects the absence of a detected object from the output signal of the time measurement circuit 50.

A step 131 following the step 125 determines whether or not the calculated distance to the detected object is shorter than a predetermined reference value, that is, whether or not the calculated distance to the detected object is in a prescribed short range. In the case where the calculated distance to the detected object is shorter than the predetermined reference value, the program exits from the step 131 and then the current execution cycle of the program segment ends. On the other hand, in the case where the calculated distance to the detected object is not shorter than the predetermined reference value or in the case where a detected object is absent, the program advances from the step 131 to a step 140.

The step 140 sets the power control signal into the state corresponding to the normal power. After the step 140, the program advances to a step 150.

The step 150 outputs the light-emission start requirement signal and the pulse-width control signal to the signal generation circuit 40. Therefore, the pulse generation circuit 40 outputs a pulse of the transmission signal to the laser-diode drive circuit 12. The time point of the leading edge of the pulse is determined by the light-emission start requirement signal, while the width of the pulse is determined by the pulse-width control signal.

The laser-diode drive circuit 12 activates the laser diode 11 in response to the pulse of the transmission signal so that the laser diode 11 emits a corresponding pulse of the laser light. The time point of the leading edge of the pulse of the laser light is determined by the light-emission start requirement signal, while the width of the pulse of the laser light is determined by the pulse-width control signal. Since the power control signal is in the state corresponding to the normal power (see the step 140), the power of the pulse of the laser light is equal to the normal power. The pulse of the laser light is made into a pulse of the forward laser beam. Since the power of the pulse of the forward laser beam is equal to the normal power, the measurable distance to an object is equal to normal one. Only in the presence of an object spaced from the subject vehicle by equal to or shorter than the normal measurable distance, the comparator 35 outputs a high-level decision signal representing the reception of an echo.

A step 160 following the step 150 derives the measured time interval from the output signal of the time measurement circuit 50. The step 160 calculates the distance to the detected object from the subject vehicle on the basis of the measured time interval and the velocity of light. After the step 160, the current execution cycle of the program segment ends.

The step 120 in FIG. 5 provides a preliminary emission of the laser light. The step 150 in FIG. 5 provides a main emission of the laser light which is executed after the preliminary emission thereof. A set of a preliminary emission of the laser light and a main emission thereof is executed for each of the directions (the angular directions)

D1–DN of the transmission of the forward pulse laser beam which form the detection area. Thus, a set of a preliminary emission of the laser light and a main emission thereof is repetitively executed a plurality of times during every cycle or period of the motor drive signal outputted from the microcomputer 90 to the motor drive circuit 18 (see FIG. 1), that is, during every period of the scanning of the detection area by the forward pulse laser beam.

Figure 6:
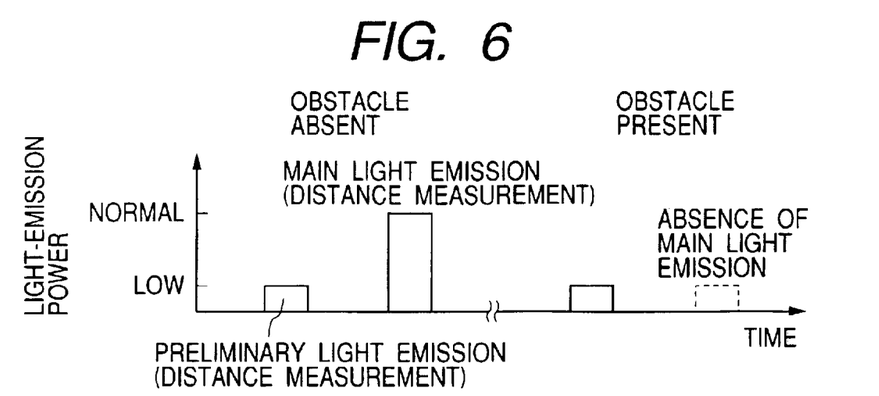
FIG. 6 is a time-domain diagram of laser light emissions in the third embodiment of this invention.

With reference to FIG. 6, regarding every set, the main emission is executed only in the case where an object is not detected in response to the preliminary emission. The main emission is not executed in the case where an object is detected in response to the preliminary emission. The non-execution of the main emission reduces the number of times of the activation of the laser diode 11 and lengthens the life thereof.

The step 125 in FIG. 5 corresponds to a second calculating means. The step 131 in FIG. 5 corresponds to an obstacle judging means.

Fourth Embodiment

Figure 7:
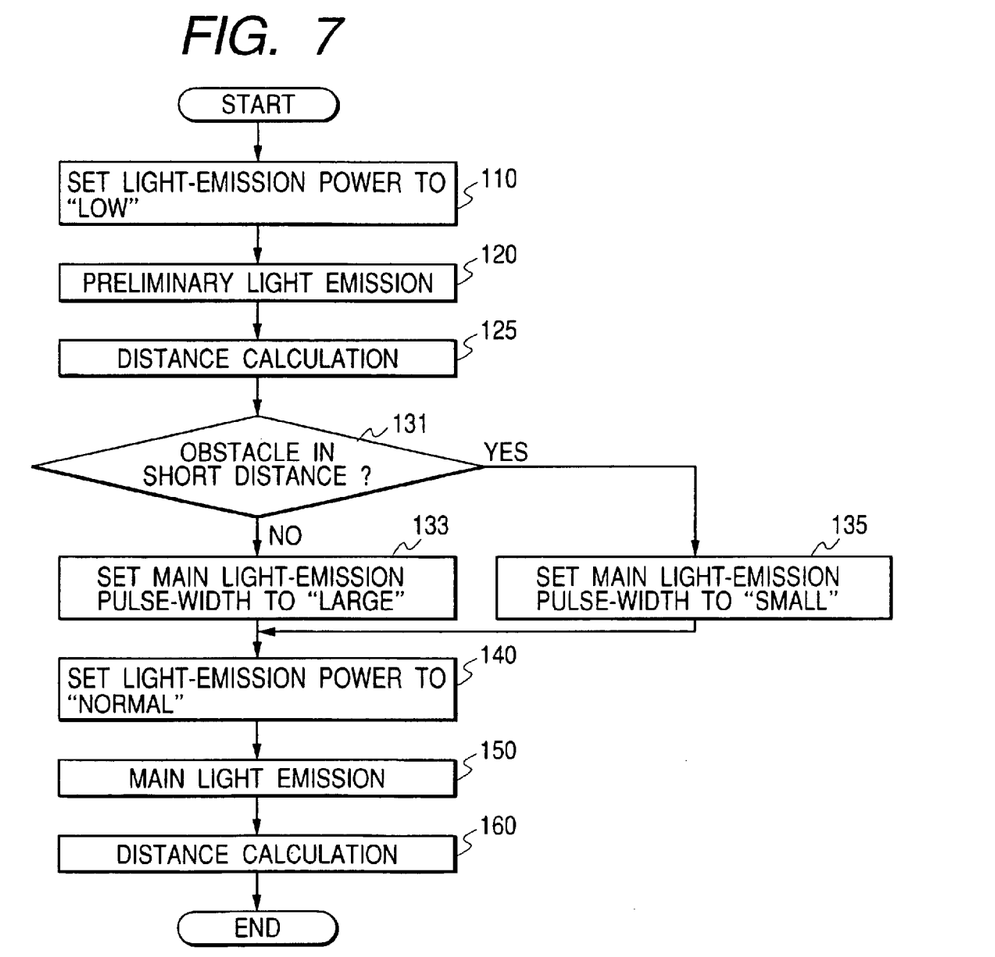
FIG. 7 is a flowchart of a segment of a program for a microcomputer in a fourth embodiment of this invention.

A fourth embodiment of this invention is similar to the third embodiment thereof except for design changes mentioned hereafter. FIG. 7 is a flowchart of a segment of a program for a microcomputer 90 (see FIG. 1) according to the fourth embodiment of this invention. The program segment in FIG. 7 is a modification of the program segment in FIG. 5.

As shown in FIG. 7, a first step 110 of the program segment sets the power control signal into the state corresponding to lower than the normal power.

A step 120 following the step 110 sets the pulse-width control signal to a state corresponding to a predetermined large pulse-width. The step 120 outputs the light-emission start requirement signal and the pulse-width control signal to the signal generation circuit 40 (see FIG. 1). Therefore, the pulse generation circuit 40 outputs a pulse of the transmission signal to the laser-diode drive circuit 12 (see FIG. 1). The time point of the leading edge of the pulse is determined by the light-emission start requirement signal, while the width of the pulse is determined by the pulse-width control signal.

The laser-diode drive circuit 12 activates the laser diode 11 (see FIG. 1) in response to the pulse of the transmission signal so that the laser diode 11 emits a corresponding pulse of the laser light. The time point of the leading edge of the pulse of the laser light is determined by the light-emission start requirement signal, while the width of the pulse of the laser light is determined by the pulse-width control signal. Since the power control signal is in the state corresponding to lower than the normal power, the power of the pulse of the laser light is lower than the normal power. Since the pulse-width control signal is in the state corresponding to the predetermined large pulse-width (see the step 120), the width of the pulse of the laser light is equal to a large value. The pulse of the laser light is made into a pulse of the forward laser beam. Since the power of the pulse of the forward laser beam is relatively low, the measurable distance to an object is shorter than normal one. Accordingly, only in the presence of an object spaced from the subject vehicle by shorter than the normal measurable distance, the comparator 35 (see FIG. 1) outputs a high-level decision signal representing the reception of an echo.

A step 125 subsequent to the step 120 derives the measured time interval from the output signal of the time measurement circuit 50 (see FIG. 1). The step 125 calculates the distance to the detected object from the subject vehicle on the basis of the measured time interval and the velocity of light. In the absence of a received echo, the step 125 detects the absence of a detected object from the output signal of the time measurement circuit 50.

A step 131 following the step 125 determines whether or not the calculated distance to the detected object is shorter than a predetermined reference value, that is, whether or not the calculated distance to the detected object is in a prescribed short range. In the case where the calculated distance to the detected object is shorter than the predetermined reference value, the program advances from the step 131 to a step 135. On the other hand, in the case where the calculated distance to the detected object is not shorter than the predetermined reference value or in the case where a detected object is absent, the program advances from the step 131 to a step 133.

The step 133 sets the pulse-width control signal to the state corresponding to the predetermined large pulse-width. After the step 133, the program advances to a step 140.

The step 135 sets the pulse-width control signal to a state corresponding to a predetermined small pulse-width narrower than the predetermined large pulse-width. After the step 135, the program advances to the step 140.

The step 140 sets the power control signal into the state corresponding to the normal power. After the step 140, the program advances to a step 150.

The step 150 outputs the light-emission start requirement signal and the pulse-width control signal to the signal generation circuit 40 (see FIG. 1). Therefore, the pulse generation circuit 40 outputs a pulse of the transmission signal to the laser-diode drive circuit 12 (see FIG. 1). The time point of the leading edge of the pulse is determined by the light-emission start requirement signal, while the width of the pulse is determined by the pulse-width control signal.

The laser-diode drive circuit 12 activates the laser diode 11 (see FIG. 1) in response to the pulse of the transmission signal so that the laser diode 11 emits a corresponding pulse of the laser light. The time point of the leading edge of the pulse of the laser light is determined by the light-emission start requirement signal, while the width of the pulse of the laser light is determined by the pulse-width control signal. In the case where the step 131 determines the detection of an object in the prescribed short range, since the pulse-width control signal is in the state corresponding to the predetermined small pulse-width (see the step 135), the width of the pulse of the laser light is equal to a small value. On the other hand, in the case where the step 131 determines the non-detection of an object in the prescribed short range, since the pulse-width control signal is in the state corresponding to the predetermined large pulse-width (see the step 133), the width of the pulse of the laser light is equal to the large value. Since the power control signal is in the state corresponding to the normal power (see the step 140), the power of the pulse of the laser light is equal to the normal power. The pulse of the laser light is made into a pulse of the forward laser beam. Since the power of the pulse of the forward laser beam is equal to the normal power, the measurable distance to an object is equal to normal one. Only in the presence of an object spaced from the subject vehicle by equal to or shorter than the normal measurable distance, the comparator 35 (see FIG. 1) outputs a high-level decision signal representing the reception of an echo.

A step 160 following the step 150 derives the measured time interval from the output signal of the time measurement circuit 50. The step 160 calculates the distance to the detected object from the subject vehicle on the basis of the measured time interval and the velocity of light. After the step 160, the current execution cycle of the program segment ends.

A step 120 in FIG. 7 provides a preliminary emission of the laser light. The step 150 in FIG. 7 provides a main emission of the laser light which is executed after the preliminary emission thereof. A set of a preliminary emission of the laser light and a main emission thereof is executed for each of the directions (the angular directions) D1–DN of the transmission of the forward pulse laser beam which form the detection area. Thus, a set of a preliminary emission of the laser light and a main emission thereof is repetitively executed a plurality of times during every cycle or period of the motor drive signal outputted from the microcomputer 90 to the motor drive circuit 18 (see FIG. 1), that is, during every period of the scanning of the detection area by the forward pulse laser beam.

Figure 8:
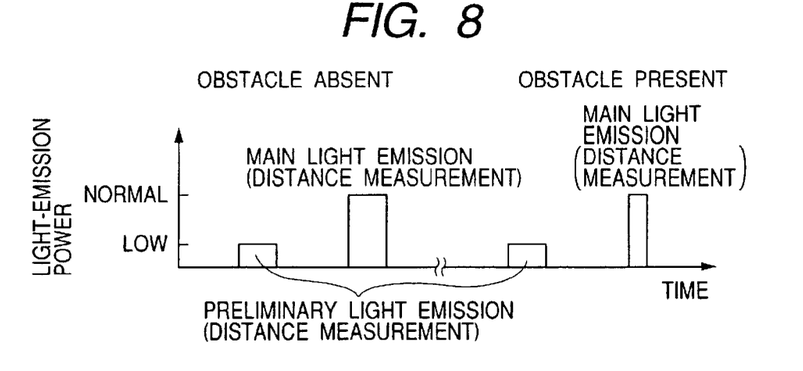
FIG. 8 is a time-domain diagram of laser light emissions in the fourth embodiment of this invention.

As shown in FIG. 8, the power of the laser light generated by preliminary emissions remains equal to a prescribed low level. In addition, the widths of pulses of the laser light generated by preliminary emissions are equal to the large value. The power of the laser light generated by main emissions remains equal to a normal level. On the other hand, the width of a pulse of the laser light generated by a main emission is changed between the large value value and a small value (less than the large value) depending on whether or not an object in the prescribed short range is detected as a result of the immediately-preceding preliminary emission. Specifically, the width of a pulse of the laser light generated by a main emission is equal to the large value in the case where an object in the prescribed short range is not detected as a result of the immediately-preceding preliminary emission. On the other hand, the width of a pulse of the laser light generated by a main emission is equal to the small value in the case where an object in the prescribed short range is detected as a result of the immediately-preceding preliminary emission. The small-width pulse of the laser light less adversely affects human eyes.

Fifth Embodiment

A fifth embodiment of this invention is similar to the fourth embodiment thereof except for design changes mentioned hereafter. According to the fifth embodiment of this invention, a decision step similar to the step 130 (see FIG. 3) replaces the steps 125 and 131 (see FIG. 7). The decision step determines whether or not the comparator 35 (see FIG. 1) outputs a high-level decision signal during a time interval corresponding to the low-power measurable distance. In the case where the comparator 35 outputs a high-level decision signal, that is, in the case where an object is detected, the program advances from the decision step to the step 135 (see FIG. 7). On the other hand, in the case where the comparator 35 does not output a high-level decision signal, that is, in the case where an object is not detected, the program advances from the decision step to the step 133 (see FIG. 7).

Sixth Embodiment

Figure 9:
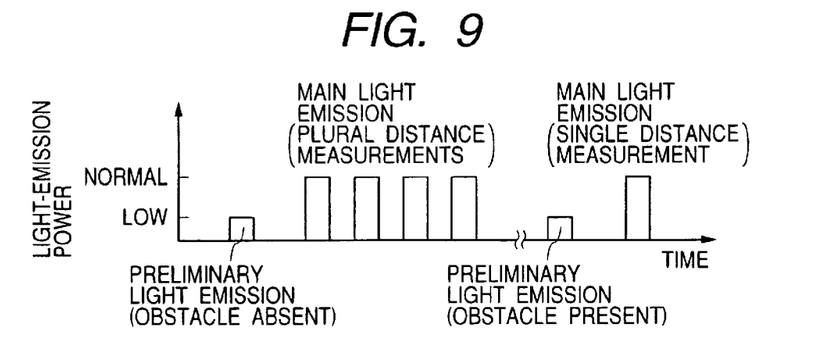
FIG. 9 is a time-domain diagram of laser light emissions in a sixth embodiment of this invention.

A sixth embodiment of this invention is similar to one of the first to fifth embodiments thereof except for design changes mentioned hereafter. With reference to FIG. 9, the sixth embodiment of this invention replaces every main emission of the laser light with a main emission procedure which produces either one pulse or a plurality of pulses.

According to the sixth embodiment of this invention, a plurality of pulses (for example, four pulses) of the laser light are sequentially generated by a main emission procedure in the case where an object is not detected as a result of the immediately-preceding preliminary emission. On the other hand, one pulse of the laser light is generated by a main emission procedure in the case where an object is detected as a result of the immediately-preceding preliminary emission.

Seventh Embodiment

A seventh embodiment of this invention is similar to one of the first to fifth embodiments thereof except for design changes mentioned hereafter. The seventh embodiment of this invention replaces every main emission of the laser light with a main emission procedure which produces a plurality of pulses.

In the seventh embodiment of this invention, a signal generation circuit 40 (see FIG. 1) produces one of a transmission signal having only one pulse for a preliminary emission, a transmission signal of a P-bit pseudo noise code for a main emission procedure, and a transmission signal of a Q-bit pseudo noise code for a main emission procedure, where "P" denotes a predetermined natural number and "Q" denotes a predetermined natural number smaller than the predetermined natural number "P". The transmission signal of the P-bit pseudo noise code has a sequence of pulses. Similarly, the transmission signal of the Q-bit pseudo noise code has a sequence of pulses. For example, the P-bit pseudo noise code and the Q-bit pseudo noise code are a 127-chip maximum length code and a 15-chip maximum length code respectively. The forward laser beam transmitted from a light emitting portion 10 (see FIG. 1) is modulated in accordance with the transmission signal outputted from the signal generation circuit 40.

In the seventh embodiment of this invention, a time measurement circuit 50 (see FIG. 1) calculates a correlation between the transmission signal and an echo signal outputted from a light receiving portion 20 (see FIG. 1). The time measurement circuit 50 detects a timing at which the calculated correlation peaks. The time measurement circuit 50 informs a microcomputer 90 (see FIG. 1) of the detected timing. The microcomputer 90 calculates the distance to a detected object from the subject vehicle on the basis of the detected timing.

Figure 10:
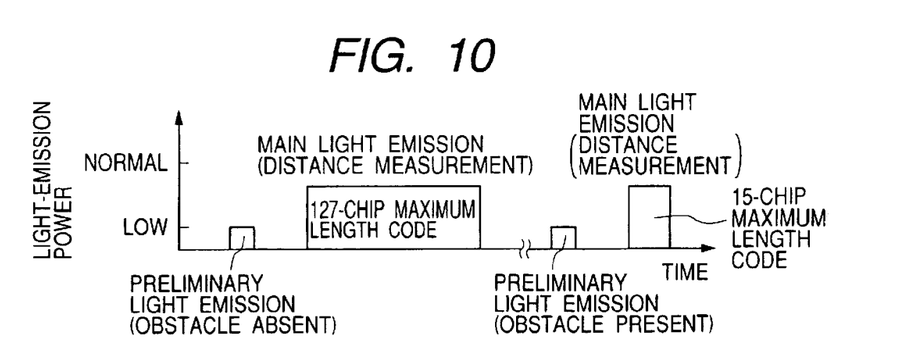
FIG. 10 is a time-domain diagram of laser light emissions in a seventh embodiment of this invention.

According to the seventh embodiment of this invention, one pulse of the laser light is generated by a preliminary emission. With reference to FIG. 10, the transmission signal of the P-bit pseudo noise code (for example, the 127-chip maximum length code) is outputted from the signal generation circuit 40 and hence a corresponding plurality of pulses of the laser light are sequentially generated by a main emission procedure in the case where an object is not detected as a result of the immediately-preceding preliminary emission. On the other hand, the transmission signal of the Q-bit pseudo noise code (for example, the 15-chip maximum length code) is outputted from the signal generation circuit 40 and hence a corresponding plurality of pulses of the laser light are sequentially generated by a main emission procedure in the case where an object is detected as a result of the immediately-preceding preliminary emission. The sequence of pulses of the laser light which corresponds to the Q-bit pseudo noise code (for example, the 15-chip maximum length code) less adversely affects human eyes.

Eighth Embodiment

Figure 11:
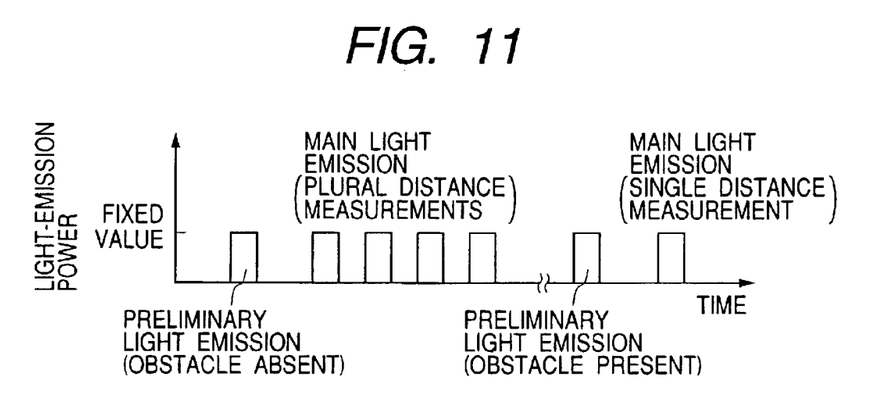
FIG. 11 is a time-domain diagram of laser light emissions in an eighth embodiment of this invention.

An eighth embodiment of this invention is similar to the sixth embodiment thereof except for a design change mentioned hereafter. In the eighth embodiment of this invention, as shown in FIG. 11, the power of the laser light generated by preliminary emissions and main emission procedures remains equal to a predetermined fixed level.

Ninth Embodiment

Figure 12:
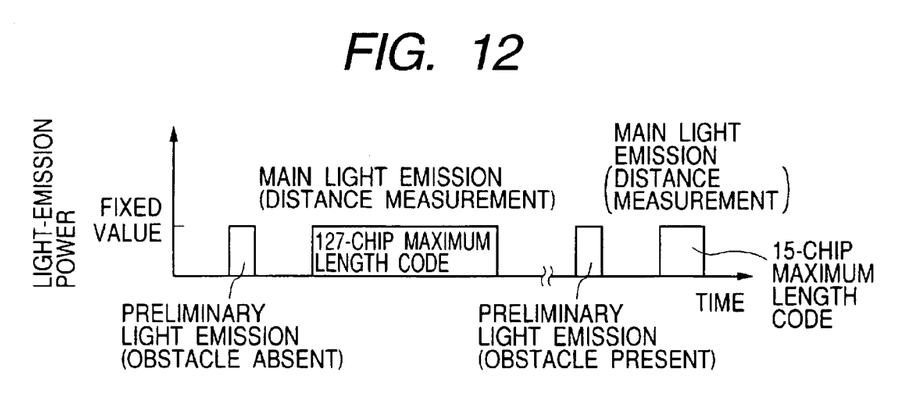
FIG. 12 is a time-domain diagram of laser light emissions in a ninth embodiment of this invention.

A ninth embodiment of this invention is similar to the seventh embodiment thereof except for a design change mentioned hereafter. In the ninth embodiment of this invention, as shown in FIG. 12, the power of the laser light generated by preliminary emissions and main emission procedures remains equal to a predetermined fixed level.

What is claimed is:

1. A distance measurement apparatus comprising:

electromagnetic wave generating means for generating and transmitting an electromagnetic wave;

scanning means for periodically changing a direction in which the electromagnetic wave is transmitted from the electromagnetic wave generating means;

receiving means for receiving an echo wave caused by reflection of the electromagnetic wave at an obstacle;

first driving means for repetitively driving the electromagnetic wave generating means a plurality of times per one period of the change of the direction by the scanning means, and thereby for causing the electromagnetic wave generating means to repetitively generate and transmit a distance measurement electromagnetic wave;

first calculating means for measuring a time interval between a moment of every generation and transmission of the distance measurement electromagnetic wave by the electromagnetic wave generating means in response to drive by the first driving means to a moment of reception of a corresponding echo wave by the receiving means, and for calculating a distance to an obstacle on the basis of the measured time interval;

second driving means for, before the first driving means drives the electromagnetic wave generating means, driving the electromagnetic wave generating means and thereby causing the electromagnetic wave generating means to generate and transmit a judgment electromagnetic wave having an energy smaller than that of the distance measurement electromagnetic wave; and obstacle judging means for judging whether an obstacle is present or absent on the basis of conditions of reception of an echo wave corresponding to the judgement electromagnetic wave by the receiving means, for permitting the first driving means to drive the electromagnetic wave generating means next in cases where it is judged that an obstacle is absent, and for inhibiting the first driving means from driving the electromagnetic wave generating means next in cases where it is judged that an obstacle is present.

2. A distance measurement apparatus comprising:

electromagnetic wave generating means for generating and transmitting an electromagnetic wave;

scanning means for periodically changing a direction in which the electromagnetic wave is transmitted from the electromagnetic wave generating means;

receiving means for receiving an echo wave caused by reflection of the electromagnetic wave at an obstacle;

first driving means for repetitively driving the electromagnetic wave generating means a plurality of times per one period of the change of the direction by the scanning means, and thereby for causing the electromagnetic wave generating means to repetitively generate and transmit a distance measurement electromagnetic wave;

first calculating means for measuring a time interval between a moment of every generation and transmission of the distance measurement electromagnetic wave by the electromagnetic wave generating means in response to drive by the first driving means to a moment of reception of a corresponding echo wave by the receiving means, and for calculating a distance to an obstacle on the basis of the measured time interval;

second driving means for, before the driving means drives the electromagnetic wave generating means, driving the electromagnetic wave generating means and thereby causing the electromagnetic wave generating means to generate and transmit a judgment electromagnetic wave having an energy smaller than that of the distance measurement electromagnetic wave; and obstacle judging means for judging whether an obstacle is present or absent on the basis of conditions of reception of an echo wave corresponding to the judgement electromagnetic wave by the receiving means, for causing the first driving means to drive the electromagnetic wave generating means next to generate and transmit a first distance measurement electromagnetic wave in cases where it is judged that an obstacle is absent, and for causing the first driving means to drive the electromagnetic wave generating means next to generate and transmit a second distance measurement electromagnetic wave in cases where it is judged that an obstacle is present, wherein the second distance measurement electromagnetic wave is lower in energy than the first distance measurement electromagnetic wave.

3. A distance measurement apparatus as recited in claim 2, wherein the second distance measurement electromagnetic wave is lower in amplitude than the first distance measurement electromagnetic wave.

4. A distance measurement apparatus as recited in claim 2, wherein a duration of generation of the second distance measurement electromagnetic wave is shorter than that of the first distance measurement electromagnetic wave.

5. A distance measurement apparatus as recited in claim 2, wherein each of the first distance measurement electromagnetic wave and the second distance measurement electromagnetic wave contains at least one pulse, and a pulse in the second distance measurement electromagnetic wave is smaller in width than that in the first distance measurement electromagnetic wave.

6. A distance measurement apparatus as recited in claim 2, wherein each of the first distance measurement electromagnetic wave and the second distance measurement electromagnetic wave contains at least one pulse, and the second distance measurement electromagnetic wave is smaller in pulse number than the first distance measurement electromagnetic wave.

7. A distance measurement apparatus as recited in claim 2, wherein the first distance measurement electromagnetic wave results from modulation in accordance with a pseudo noise code having a first bit length, and the second distance measurement electromagnetic wave results from modulation in accordance with a pseudo noise code having a second bit length smaller than the first bit length.

8. A distance measurement apparatus as recited in claim 2, wherein the obstacle judging means comprises second calculating means for measuring a time interval between a moment of every generation and transmission of the judgement electromagnetic wave by the electromagnetic wave generating means in response to drive by the second driving means to a moment of reception of a corresponding echo wave by the receiving means, and for calculating a distance to an obstacle on the basis of the measured time interval, and judging means for judging whether an obstacle is present in or absent from a prescribed distance range on the basis of the distance calculated by the second calculating means.

9. A distance measurement apparatus comprising:

first means for emitting a first laser beam in a first direction, the first laser beam having a first power;

second means for receiving an echo corresponding to the first laser beam;

third means for determining whether or not the second means receives an echo corresponding to the first laser beam;

fourth means for emitting a second laser beam in the first direction in cases where the third means have determined that the second means receives an echo corresponding to the first laser beam, the second laser beam having a second power;

fifth means for emitting a third laser beam in the first direction in cases where the third means have determined that the second means does not receive an echo corresponding to the first laser beam, the third laser beam having a third power, the third power being higher than the first power, the third power being higher than the second power;

sixth means for emitting a fourth laser beam in a second direction after the fourth means emits the second laser beam or the fifth means emits the third laser beam, the second direction being different from the first direction, the fourth laser beam having the first power;

seventh means for receiving an echo corresponding to the fourth laser beam;

eighth means for determining whether or not the seventh means receives an echo corresponding to the fourth laser beam;

ninth means for emitting a fifth laser beam in the second direction in cases where the eighth means have determined that the seventh means receives an echo corresponding to the fourth laser beam, the fifth laser beam having the second power; and tenth means for emitting a sixth laser beam in the second direction in cases where the eighth means have determined that the seventh means does not receive an echo corresponding to the fourth laser beam, the sixth laser beam having the third power.

10. A distance measurement apparatus comprising:

first means for emitting a first laser beam in a first direction, the first laser beam having a first power;

second means for receiving an echo corresponding to the first laser beam;

third means for determining whether or not the second means receives an echo corresponding to the first laser beam;

fourth means for emitting a second laser beam in the first direction in cases where the third means have determined that the second means does not receive an echo corresponding to the first laser beam, the second laser beam having a second power higher than the first power;

fifth means for inhibiting the fourth means from emitting the second laser beam in cases where the third means have determined that the second means receives an echo corresponding to the first laser beam;

sixth means for emitting a third laser beam in a second direction after the fourth means emits the second laser beam or the fifth means inhibits the fourth means from emitting the second laser beam, the second direction being different from the first direction, the third laser beam having the first power;

seventh means for receiving an echo corresponding to the third laser beam;

eighth means for determining whether or not the seventh means receives an echo corresponding to the third laser beam;

ninth means for emitting a fourth laser beam in the second direction in cases where the eighth means have determined that the seventh means does not receive an echo corresponding to the third laser beam, the fourth laser beam having the second power; and tenth means for inhibiting the ninth means from emitting the fourth laser beam in cases where the eighth means have determined that the seventh means receives an echo corresponding to the third laser beam.

* * * * *